(No Model.)
J. T. PRIOR.
FISH HOOK.
No. 456,776. Patented July 28, 1891.
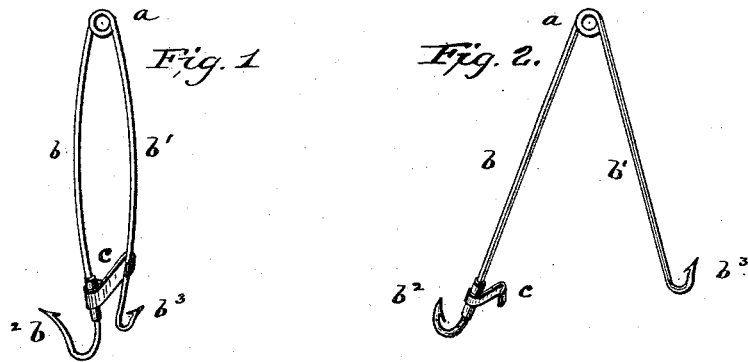
Witnesses
Frank Gibson.
C. D. Davis
Inventor
John T. Prior
By his Attorney
C. M. Alexander

UNITED STATES PATENT OFFICE.

JOHN THOMAS PRIOR, OF PRIOR'S STATION, GEORGIA.

FISH-HOOK.

SPECIFICATION forming part of Letters Patent No. 456,776, dated July 28, 1891.

Application filed January 26, 1891. Serial No. 379,067. (No model.)

*To all whom it may concern:*

Be it known that I, JOHN THOMAS PRIOR, a citizen of the United States, residing at Prior's Station, in the county of Polk and State of Georgia, have invented certain new and useful Improvements in Fish-Hooks, of which the following is a specification, reference being had therein to the accompanying drawings, in which—

Figure 1 represents a side view of the preferred form of my improved fish-hook set ready for operation, and Fig. 2 a similar view showing the hooks in their normal positions when sprung.

This invention relates to that class of fish-hooks constructed of a single piece of spring-steel wire and formed into a pair of depending outwardly-springing hooks, one of the hooks carrying a catch which is adapted to hold the hooks together or in a set position until a fish bites at the bait, whereupon the hooks are released and permitted to spring outwardly and impale the fish, as will presently appear.

The invention is designed to obviate certain defects found to exist in this class of hooks; and to this end it consists in certain novel features of construction that will be fully hereinafter described, and particularly pointed out in the claims appended.

In the drawings, $a$ designates a spring-coil formed about midway the length of a suitable piece of spring-wire, and $b$ $b'$ represent the two portions of said wire, which are bent downwardly and outwardly from the coil, as shown in Fig. 2, and are formed into oppositely-turned barbed fish-hooks $b^2$ $b^3$ at their lower ends. The hook $b^2$ is made longer and larger than the hook $b^3$, so as to particularly adapt it to carrying live bait. Formed on or attached to the shank of the larger hook $b^2$ is an inwardly-extending catch or hook $c$, which is adapted to engage the shank of the other hook when the two are pressed together and hold them in a set position, as shown in Fig. 1. The line is attached to the coil $a$ at the top of hooks. It will be observed that the tendency of the hooks, when pressed in toward each other and set, is to spring outward with considerable force. Therefore when a fish bites at the hooks and exerts a slight pressure on them the catch is readily disengaged and the hooks fly apart instantly and securely impale the fish on one or the other or both the hooks.

The object in forming one hook considerably longer and larger than the other is to adapt it to carry live bait, such as minnows. This making the live-bait hook longer than the other not only prevents such bait from prematurely springing the hooks while in the water, but this feature also permits the hooks to spring apart when disengaged without catching in or snagging the bait.

As shown, the hooks do not cross each other, but stand a little apart, the advantage of this being that a slight pressure exerted at any point along their length will be sure to disengage the catch and spring the hooks, which will not be the case when the hooks are crossed.

The spring-hooks heretofore used have consisted of two depending hooks of the same length and crossed; but this construction possesses certain disadvantages which the present invention is designed to overcome. The hooks, being of the same length, are almost sure to snag the bait when sprung apart, and, furthermore, these hooks are not adapted to carrying live bait, such as minnows, inasmuch as the bait in its endeavors to release itself is almost sure to prematurely spring the hooks. Crossing the hooks is objectionable, for the reason that if the fish bites them at the point of crossing they are not sure to be released readily.

Having thus described my invention, what I claim is—

1. A fish-hook constructed of two depending spring-hooks, one of said hooks being longer than the other to adapt it to carry live bait, and a setting catch carried by one of the hooks and adapted to engage the other, substantially as described.

2. A fish-hook constructed of two depending spring-hooks having a tendency to spring apart, and a fixed catch projecting inwardly from one of the hooks and engaging the other hook, the hooks being held apart so as not to cross each other, whereby the hooks may be disengaged by a slight pressure at any point along their length, substantially as described.

3. A fish-hook constructed of two depending spring-hooks, one of said hooks being longer than the other to adapt it to carry live bait, and a fixed catch projecting inwardly from one of the hooks and engaging the other hook, the hooks being thereby held apart so as not to cross each other, as and for the purposes described.

In testimony whereof I affix my signature in presence of two witnesses.

JOHN THOMAS PRIOR.

Witnesses:
 JOHN HUTCHINGS,
 JO L. GROSS.